United States Patent
Zhu et al.

(10) Patent No.: US 12,327,572 B2
(45) Date of Patent: Jun. 10, 2025

(54) SYSTEMS AND METHODS FOR GENERATING TRAILERS (SUMMARIES) FOR AUDIO CONTENT USING A SHORT ROLLING TIME WINDOW

(71) Applicant: Spotify AB, Stockholm (SE)

(72) Inventors: Xingran Zhu, Stockholm (SE); Jussi Jerker Karlgren, Stockholm (SE); Md. Iftekhar Tanveer, Revere, MA (US)

(73) Assignee: Spotify AB, Stockholm (SE)

( * ) Notice: Subject to any disclaimer, the term of this patent is extended or adjusted under 35 U.S.C. 154(b) by 184 days.

(21) Appl. No.: 17/855,637

(22) Filed: Jun. 30, 2022

(65) Prior Publication Data

US 2023/0005497 A1    Jan. 5, 2023

Related U.S. Application Data (60) Provisional application No. 63/217,603, filed on Jul. 1, 2021.

(51) Int. Cl.

| | |
|---|---|
| *G10L 25/63* | (2013.01) |
| *G06F 16/9535* | (2019.01) |
| *G06F 40/20* | (2020.01) |
| *G10L 15/04* | (2013.01) |
| *G10L 15/22* | (2006.01) |
| *G10L 25/30* | (2013.01) |

(Continued)

(52) U.S. Cl.
CPC .............. *G10L 25/63* (2013.01); *G10L 15/04* (2013.01); *G10L 15/22* (2013.01); *G10L 25/30* (2013.01)

(58) Field of Classification Search
CPC ......... G10L 25/63; G10L 25/30; G10L 25/45; G06F 16/9535
See application file for complete search history.

(56) References Cited

U.S. PATENT DOCUMENTS

| | | | |
|---|---|---|---|
| 2004/0088289 A1 | 5/2004 | Xu et al. | |
| 2016/0249116 A1 | 8/2016 | Harb | |
| 2019/0027188 A1* | 1/2019 | Akolkar | ................... G06F 40/20 |

(Continued)

FOREIGN PATENT DOCUMENTS

| | | | | |
|---|---|---|---|---|
| CN | 201911093019 | * | 3/2020 | ......... G06F 16/9535 |
| CN | 113241095 A | * | 6/2021 | ............. G10L 25/45 |
| WO | WO/2021/051577 | * | 3/2021 | ............. G10L 25/30 |

OTHER PUBLICATIONS

F. Burkhardt, A. Paeschke, M. Rolfes, W. Sendlmeier, and B. Weiss. A database of german emotional speech. vol. 5, pp. 1517-1520, Jan. 2005, 4 pages.

(Continued)

*Primary Examiner* — Farzad Kazeminezhad
(74) *Attorney, Agent, or Firm* — Morgan, Lewis & Bockius LLP (57) ABSTRACT

An electronic device receives an audio file and divides the audio file into a plurality of segments. The electronic device, automatically, without user input, determines, for each segment, a descriptor from a plurality of descriptors and a value of the descriptor for the segment. The electronic device selects one or more segments of the plurality of segments, based on a comparison of the respective values of respective descriptors for respective segments and genre-specific criteria selected based on a genre of the audio file. The electronic device generates a trailer for the audio file using the selected one or more segments.

20 Claims, 7 Drawing Sheets

(51) Int. Cl.
*G10L 25/45* (2013.01)
*H04L 12/18* (2006.01)

(56) References Cited

U.S. PATENT DOCUMENTS

2021/0144442 A1   5/2021  Liu et al.
2022/0353101 A1*  11/2022 Hu ..................... H04L 12/1822

OTHER PUBLICATIONS

Y.-F. Ma, L. Lu, H.-J. Zhang, and M. Li. A user attention model for video summarization. In Proceedings of the Tenth ACM International Conference on Multimedia, Multimedia '02, p. 533-542, New York, NY, USA, 2002. Association for Computing Machinery. ISBN 158113620X. doi: 10.1145/641007.641116. URL https://doi.org/10.1145/641007.641116, 10 pages.
D. Szameitat, C. Darwin, D. Wildgruber, K. Alter, and A. Szameitat. Acoustic correlates of emotional dimensions in laughter: Arousal, dominance, and valence. Cognition & emotion, 25:599-611, Jun. 2011. doi: 10.1080/02699931.2010.508624, 14 pages.
A. S. Bhat, V. Amith, N. S. Prasad, and D. M. Mohan. An efficient classification algorithm for music mood detection in western and hindi music using audio feature extraction. In 2014 Fifth International Conference on Signal and Image Processing, pp. 359-364, 2014. doi: 10.1109/ICSIP.2014.63, 6 pages.
D. Doukhan, J. Carrive, F. Vallet, A. Larcher, and S. Meignier. An open-source speaker gender detection framework for monitoring gender equality. In Acoustics Speech and Signal Processing (ICASSP), 2018 IEEE International Conference on. IEEE, 2018a, 5 pages.
C. Brachmann, H. I. Chunpir, S. Gennies, B. Haller, P. Kehl, A. P. Mochtarram, D. Möhlmann, C. Schrumpf, C. Schultz, B. Stolper, B. Walther-Franks, A. Jacobs, T. Hermes, and O. Herzog. Automatic Movie Trailer Generation Based on Semantic Video Patterns, pp. 145-158. transcript-Verlag, 2015. doi: doi:10.14361/9783839410233-011. URL https://doi.org/10.14361/9783839410233-011, 15 pages.
G. Irie, T. Satou, A. Kojima, T. Yamasaki, and K. Aizawa. Automatic trailer generation. In Proceedings of the 18th ACM International Conference on Multimedia, MM '10, p. 839-842, New York, NY, USA, 2010a. Association for Computing Machinery. ISBN, 5 pages.
K. Ryokai, E. Durán López, N. Howell, J. Gillick, and D. Bamman. Capturing, representing, and interacting with laughter. In Proceedings of the 2018 CHI Conference on Human Factors in Computing Systems, CHI '18, p. 1-12, New York, NY, USA, 2018. Association for Computing Machinery. ISBN 9781450356206. doi: 10.1145/3173574.3173932. URL https://doi.org/10.1145/3173574.3173932, 12 pages.
A. G. Hauptmann, M. G. Christel, W.-H. Lin, B. Maher, J. Yang, R. V. Baron, and G. Xiang. Clever clustering vs. simple speed-up for summarizing rushes. In Proceedings of the International Workshop on TRECVID Video Summarization, TVS '07, p. 20-24, New York, NY, USA, 2007. Association for Computing Machinery. ISBN 9781595937803. doi: 10.1145/1290031.1290034. URL https://doi.org/10.1145/1290031.1290034, 7 pages.
E. Scheirer and M. Slaney. Construction and evaluation of a robust multifeature speech/music discriminator. In 1997 IEEE International Conference on Acoustics, Speech, and Signal Processing, vol. 2, pp. 1331-1334 vol. 2, 1997. doi: 10.1109/ICASSP.1997.596192. URL https://labrosa.ee.columbia.edu/sounds/musp/scheislan.html, 4 pages.
H. Cao, D. G. Cooper, M. K. Keutmann, R. C. Gur, A. Nenkova, and R. Verma. Crema-d: Crowd-sourced emotional multimodal actors dataset. IEEE Transactions on Affective Computing, 5(4):377-390, 2014. doi: 10.1109/TAFFC.2014.2336244, 14 pages.
D. Szameitat, K. Alter, A. Szameitat, C. Darwin, D. Wildgruber, S. Dietrich, and A. Sterr. Differentiation of emotions in laughter at the behavioral level. Emotion (Washington, D.C.), 9:397-405, Jul. 2009. doi: 10.1037/a0015692, 9 pages.
S. Latif, R. Rana, S. Khalifa, R. Jurdak, and J. Epps. Direct Modelling of Speech Emotion from Raw Speech. In Proc. Interspeech 2019, pp. 3920-3924, 2019. doi: 10.21437/Interspeech.2019-3252. URL http://dx.doi.org/10.21437/Interspeech.2019-3252, 5 pages.
O. Bălan, G. Moise, L. Petrescu, A. Moldoveanu, M. Leordeanu, and F. Moldoveanu. Emotion classification based on biophysical signals and machine learning techniques. Symmetry, 12:21, Dec. 2019. doi: 10.3390/sym12010021, 22 pages.
M. Soleymani, A. Aljanaki, Y.-H. Yang, M. N. Caro, F. Eyben, K. Markov, B. W. Schuller, R. Veltkamp, F. Weninger, and F. Wiering. Emotional analysis of music: A comparison of methods. In Proceedings of the 22nd ACM International Conference on Multimedia, MM '14, p. 1161-1164, New York, NY, USA, 2014. Association for Computing Machinery. ISBN 9781450330633. doi: 10.1145/2647868.2655019. URL https://doi.org/10.1145/2647868.2655019, 5 pages.
D. Ververidis and C. Kotropoulos. Emotional speech recognition: Resources, features, and methods. Speech Communication, 48(9):1162-1181, 2006. ISSN 0167-6393. doi: https://doi.org/10.1016/j.specom.2006.04.003. URL https://www.sciencedirect.com/science/article/pii/S0167639306000422, 22 pages.
J. R. Smith, D. Joshi, B. Huet, W. Hsu, and J. Cota. Harnessing a.i. for augmenting creativity: Application to movie trailer creation. In Proceedings of the 25th ACM International Conference on Multimedia, MM '17, p. 1799-1808, New York, NY, USA, 2017a. Association for Computing Machinery. ISBN 9781450349062. doi: 10.1145/3123266.3127906. URL https://doi.org/10.1145/3123266.3127906, 10 pages.
C. Busso, M. Bulut, C.-C. Lee, A. Kazemzadeh, E. Mower Provost, S. Kim, J. Chang, S. Lee, and S. Narayanan. Iemocap: Interactive emotional dyadic motion capture database. Language Resources and Evaluation, 42:335-359, Dec. 2008. doi: 10.1007/s10579-008-9076-6, 30 pages.
R. B. Lanjewar, S. Mathurkar, and N. Patel. Implementation and comparison of speech emotion recognition system using gaussian mixture model (gmm) and knearest neighbor (k-nn) techniques. Procedia Computer Science, 49:50-57, 2015. ISSN 1877-0509. doi: https://doi.org/10.1016/j.procs.2015.04.226. URL https://www.sciencedirect.com/science/article/pii/S1877050915007358. Proceedings of 4th International Conference on Advances in Computing, Communication and Control (ICAC3'15), 8 pages.
D. Doukhan, E. Lechapt, M. Evrard, and J. Carrive. Ina's mirex 2018 music and speech detection system. In Music Information Retrieval Evaluation eXchange (MIREX 2018), 2018b, 2 pages.
B. Zhou, A. Lapedriza, J. Xiao, A. Torralba, and A. Oliva. Learning deep features for scene recognition using places database. In Proceedings of the 27th International Conference on Neural Information Processing Systems—vol. 1, NIPS'14, p. 487-495, Cambridge, MA, USA, 2014. MIT Press, 9 pages.
O. Rehusevych and T. Firman. movie2trailer: Unsupervised trailer generation using anomaly detection, $25^{th}$ Computer Vision Winter Workshop, Feb. 3-5, 2020, 10 pages.
D. Snyder, G. Chen, and D. Povey. Musan: A music, speech, and noise corpus, 2015, 4 pages.
R. Delbouys, R. Hennequin, F. Piccoli, J. Royo-Letelier, and M. Moussallam. Music mood detection based on audio and lyrics with deep neural net, 2018, 6 pages.
F. Eyben, M. Wöllmer, and B. Schuller. Openear—introducing the munich opensource emotion and affect recognition toolkit. In 2009 3rd International Conference on Affective Computing and Intelligent Interaction and Workshops, pp. 1-6, 2009. doi: 10.1109/ACII.2009.5349350, 6 pages.
F. Eyben, M. Wöllmer, and B. Schuller. Opensmile: The munich versatile and fast opensource audio feature extractor. In Proceedings of the 18th ACM International Conference on Multimedia, MM '10, p. 1459-1462, New York, NY, USA, 2010. Association for Computing Machinery. ISBN 9781605589336. doi: 10.1145/1873951.1874246. URL https://doi.org/10.1145/1873951.1874246, 4 pages.
G. K. K. Mehmet Cenk Sezgin, Bilge Gunsel. Perceptual audio features for emotion detection. Audio Speech Music Proc, 2012. URL https://doi.org/10.1186/1687-4722-2012-16, 21 pages.
T. Giannakopoulos. pyAudioAnalysis: An open-source python library for audio signal analysis. PLOS ONE, 10(12):1-17, Dec. 2015. doi: 10.1371/journal.pone.0144610. URL https://doi.org/10.1371/journal.pone.0144610, 17 pages.

(56) References Cited

OTHER PUBLICATIONS

F. Eyben, F. Weninger, F. Gross, and B. Schuller. Recent developments in opensmile, the munich open-source multimedia feature extractor. In Proceedings of the 21st ACM International Conference on Multimedia, MM '13, p. 835-838, New York, NY, USA, 2013. Association for Computing Machinery. ISBN 9781450324045. doi: 10.1145/2502081.2502224. URL https://doi.org/10.1145/2502081.2502224, 4 pages.

C. Wang. Speech emotion recognition based on multi-feature and multi-lingual fusion, 2020, 10 pages.

J. Rintala. Speech Emotion Recognition from Raw Audio using Deep Learning. PhD thesis, 2020. URL http://urn.kb.se/resolve?urn=urn:nbn:se:kth:diya-278858, 83 pages.

H. Kuwano, Y. Taniguchi, H. Arai, M. Mori, S. Kurakake, and H. Kojima. Telop-ondemand: video structuring and retrieval based on text recognition. In 2000 IEEE International Conference on Multimedia and Expo. ICME2000. Proceedings. Latest Advances in the Fast Changing World of Multimedia (Cat. No. 00TH8532), vol. 2, pp. 759-762 vol. 2, 2000. doi: 10.1109/ICME.2000.871472, 4 pages.

F. Eyben, K. R. Scherer, B. W. Schuller, J. Sundberg, E. André, C. Busso, L. Y. Devillers, J. Epps, P. Laukka, S. S. Narayanan, and K. P. Truong. The geneva minimalistic acoustic parameter set (gemaps) for voice research and affective computing. IEEE Transactions on Affective Computing, 7(2):190-202, 2016. doi: 10.1109/TAFFC.2015.2457417, 13 pages.

A. Giraudel, M. Carré, V. Mapelli, J. Kahn, O. Galibert, and L. Quintard. The REPERE corpus : a multimodal corpus for person recognition. In Proceedings of the Eighth International Conference on Language Resources and Evaluation (LREC'12), pp. 1102-1107, Istanbul, Turkey, May 2012. European Language Resources Association (ELRA). URL http://www.lrec-conf.org/proceedings/lrec2012/pdf/707_Paper.pdf, 6 pages.

S. R. Livingstone and F. Russo. The ryerson audio-visual database of emotional speech and song (ravdess): A dynamic, multimodal set of facial and vocal expressions in north american english. PLoS ONE, 13, 2018, 35 pages.

H. Xu, Y. Zhen, and H. Zha. Trailer generation via a point process-based visual attractiveness model. In IJCAI, pp. 2198-2204, 2015. URL http://ijcai.org/Abstract/15/311, 7 pages.

B. Mahasseni, M. Lam, and S. Todorovic. Unsupervised video summarization with adversarial lstm networks. In 2017 IEEE Conference on Computer Vision and Pattern Recognition (CVPR), pp. 2982-2991, 2017. doi: 10.1109/CVPR.2017.318, 10 pages.

R. Lienhart, S. Pfeiffer, and W. Effelsberg. Video abstracting. Commun. ACM, 40(12):54-62, Dec. 1997. ISSN 0001-0782. doi: 10.1145/265563.265572. URL https://doi.org/10.1145/265563.265572, 12 pages.

K. Minami, A. Akutsu, H. Hamada, and Y. Tonomura. Video handling with music and speech detection. IEEE MultiMedia, 5(3):17-25, 1998. doi: 10.1109/93.713301, 9 pages.

L. Cai, Y. Hu, J. Dong, S. Zhou et al., Audio-Textual Emotion Recognition Based on Improved Neural Networks, Hindawi, Mathematical Problems in Engineering, Dec. 31, 2019, Article ID 2593036, 9 pages.

\* cited by examiner

502 Receive an audio file.

> 504 The audio file comprises spoken word audio content.

506 Divide the audio file into a plurality of segments.

> 508 Each segment of the plurality of segments corresponds to a sentence in the audio file.

510 Automatically, without user input, determine, for each segment, a descriptor from a plurality of descriptors and a value of the descriptor for the segment.

> 512 Determining the descriptor and the value of the descriptor comprises using a parallel neural network.
>
> 514 Each descriptor of the plurality of descriptors comprises an emotion selected from a group of emotions.
>
> 516 Respective values of respective descriptors for respective segments are based on the audio of the audio file.
>
> 518 Determining the descriptor for each segment comprises applying a rolling time window to the segment to generate a set of descriptors, each descriptor in the set of descriptors corresponding to a respective time window of the segment.

520 Select one or more segments of the plurality of segments, based on a comparison of the respective values of respective descriptors for respective segments and genre-specific criteria selected based on a genre of the audio file.

> 522 The genre-specific criteria comprise one or more descriptors of the plurality of descriptors selected based on a genre of the audio file.

> 524 Selecting the one or more segments comprises selecting the one or more segments with the highest values of the genre-specific criteria.

> 526 The genre-specific criteria are defined by a user.

> 528 Selecting the one or more segments is further based on the one or more segments satisfying user-defined criteria.

530 Generate a trailer for the audio file using the selected one or more segments.

> 532 Generating the trailer comprises combining the selected one or more segments and one or more additional segments.

> 534 The trailer is a predefined length.

FIG. 5B

SYSTEMS AND METHODS FOR GENERATING TRAILERS (SUMMARIES) FOR AUDIO CONTENT USING A SHORT ROLLING TIME WINDOW

PRIORITY APPLICATION

This application claims priority to U.S. Prov. Appl. No. 63/217,603, filed Jul. 1, 2021, which is hereby incorporated by reference in its entirety.

TECHNICAL FIELD

The disclosed embodiments relate generally to media provider systems, and, in particular, to automatically generating a trailer for a media item based on an evaluation of characteristics of the media item, including a targeted genre of the media item.

BACKGROUND

Recent years have shown a remarkable growth in consumption of digital goods such as digital music, movies, books, and podcasts, among many others. The overwhelmingly large number of these goods often makes the choice of consumers an extremely difficult task. To cope with the constantly growing complexity of making such a choice, the users typically rely on summaries or trailers of the content. Typically, generation of trailers is performed manually and provides an introduction or a summary of the content, rather than showcasing examples from the content that best represent a mood or energy of the content as a whole.

SUMMARY

While many trailer generation systems for media items require manual input from a user and/or provide a simple summary of the content of the media item, it is difficult for these systems to capture samples of the media item that best represent the stylistic qualities of the media item as a whole, and to include those samples in the trailer. Thus, there is a need for a trailer generation system that automatically, without requiring user input, determines portions from a media item to include in a trailer and arranges the portions in such a way that the overall stylistic qualities (e.g., emotion or feeling) of the media item is reflected in the trailer.

In the disclosed embodiments, systems and methods are provided for automatically generating a trailer for an audio item, such as a podcast. The system takes the audio file for the audio item, and, using a parallel neural network, determines segments from the audio file that best capture a vibe (e.g., emotion, mood, and/or energy) of the podcast (e.g., based on the genre of the podcast). For example, for a "true crime" genre podcast, the system identifies segments of the podcast episode that best capture a "fear" and/or "anger" vibe. The system optionally combines the identified segments that capture a vibe of the podcast with one or more additional portions of the podcast (e.g., an introductory segment, musical segments, etc.) to generate a podcast trailer for the podcast.

In accordance with some embodiments, a method is provided. The method includes receiving an audio file and dividing the audio file into a plurality of segments. The method further includes, automatically, without user input, determining, for each segment, a descriptor from a plurality of descriptors and a value of the descriptor for the segment. The method includes selecting one or more segments of the plurality of segments, based on a comparison of the respective values of respective descriptors for respective segments and genre-specific criteria selected based on a genre of the audio file. The method further includes generating a trailer for the audio file using the selected one or more segments.

In accordance with some embodiments, a computer system is provided. The computer system includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by a computer system with one or more processors. The one or more programs comprising instructions for performing any of the methods described herein.

Thus, systems are provided with improved methods for generating trailers for media items.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
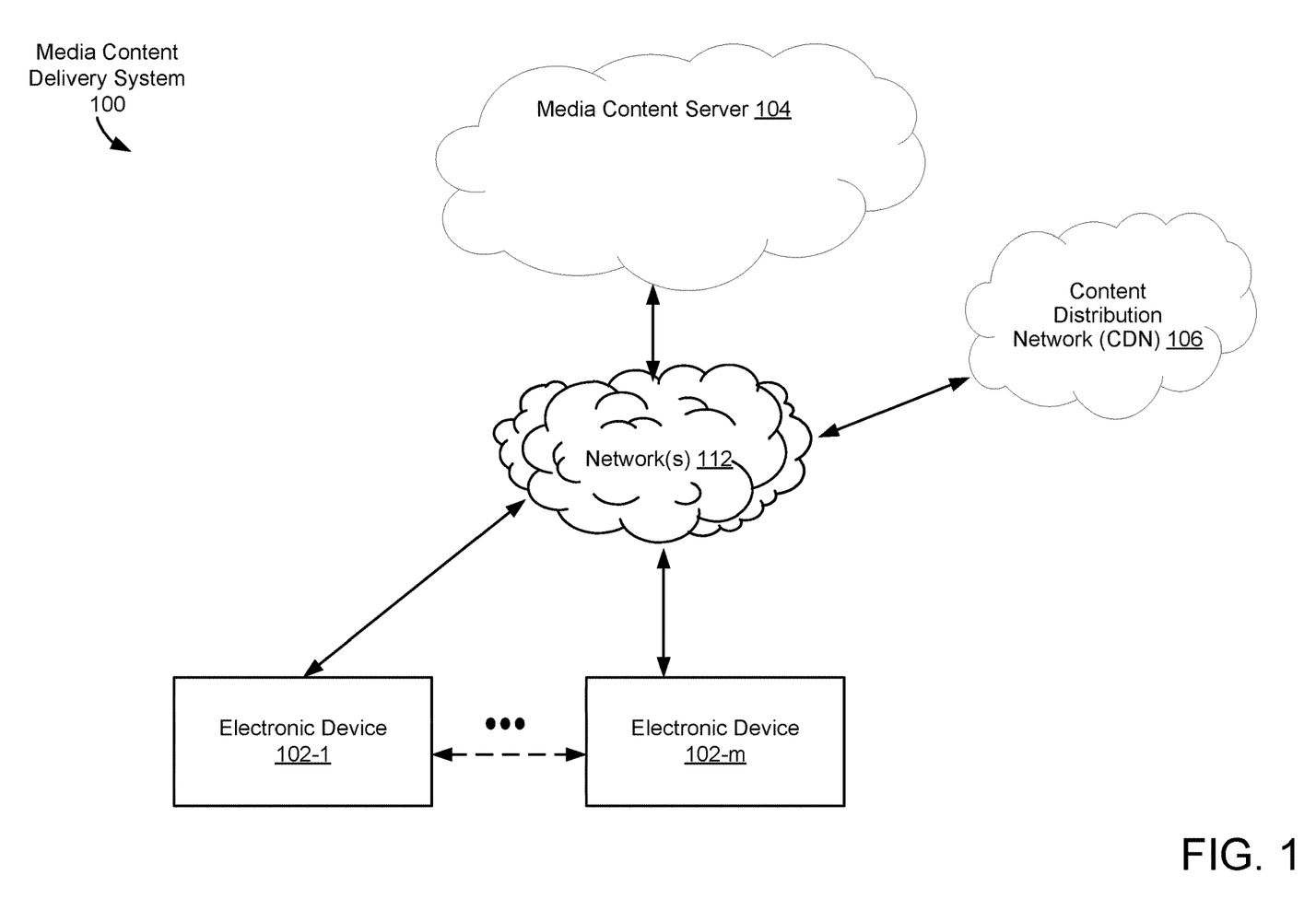
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
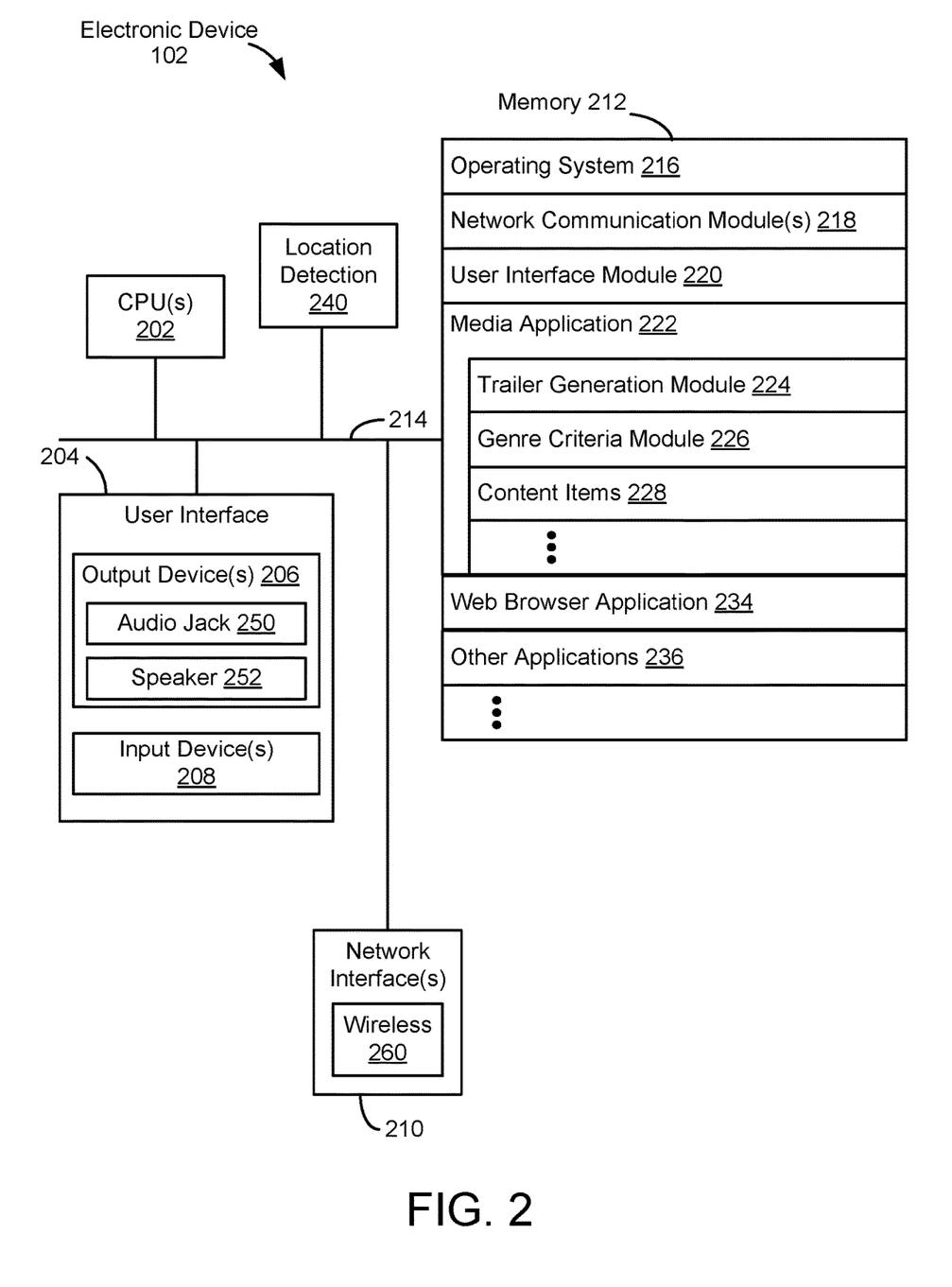
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems 108, and/or or other wireless (e.g., Bluetooth-compatible) devices (e.g., for streaming audio data to the media presentations system 108 of an automobile). Furthermore, in some embodiments, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s) 108, media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
- a trailer generation module 224 for selecting one or more segments of a media content item to include in a trailer and/or compiling one or more segments of the media content item to generate a trailer for respective media items;
- a genre criteria module 226 for identifying and/or storing genre information for respective media items, including genre-specific criteria used to select segments to be included in a trailer generated using trailer generation module 224;
- a content items module 228 for storing media items, including audio items such as podcasts, for playback and/or for forwarding requests for media content items to the media content server. In some embodiments, content items module 228 associates (e.g., stores) a trailer associated with a respective media item and provides the trailer for playback;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
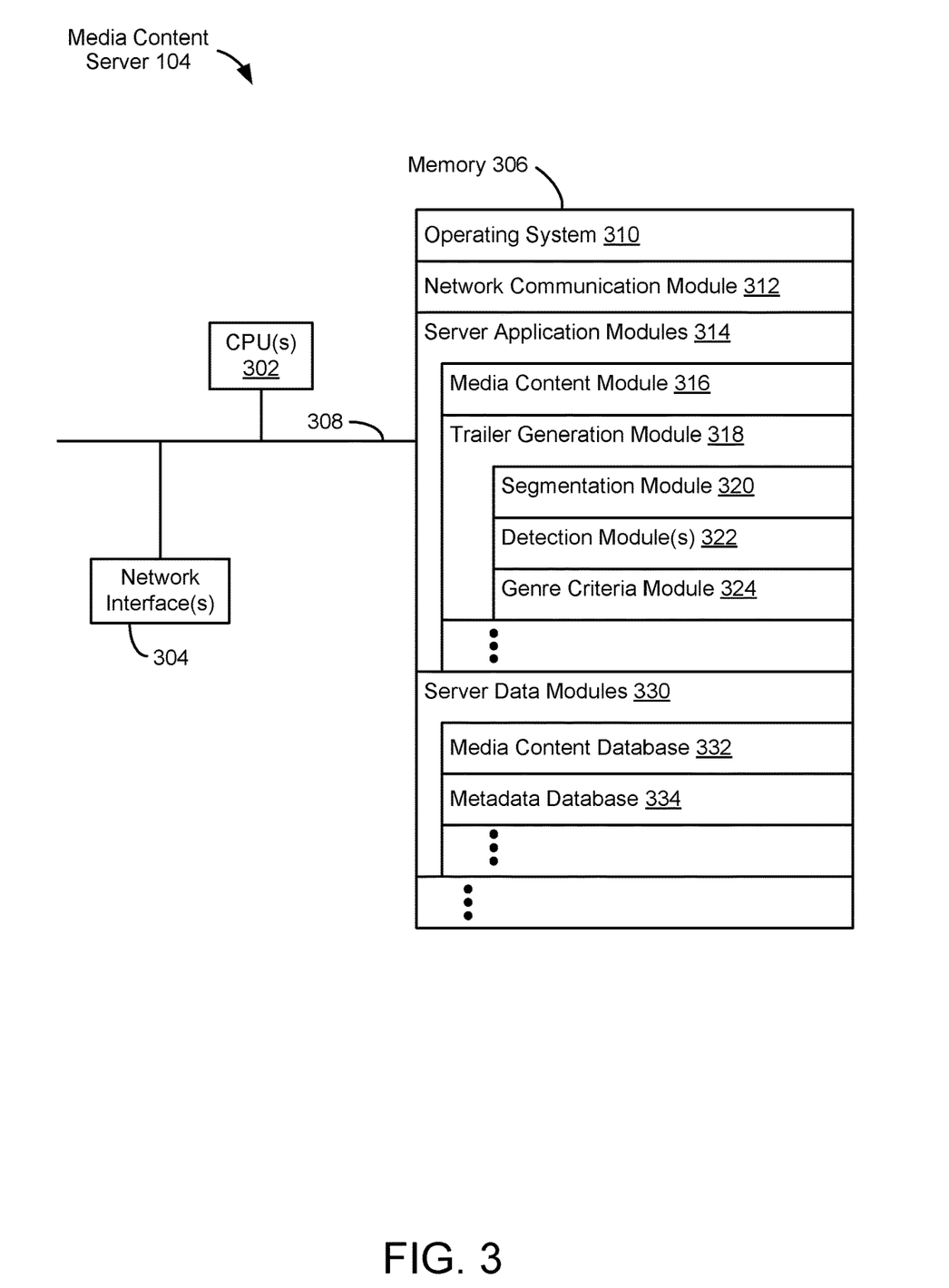
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:
- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s);
  - trailer generation module 318 for generating and/or providing (e.g., streaming) trailers of media content items, including but not limited to, one or more of:
    - segmentation module 320 for dividing a media content item into a plurality of segments (e.g., audio segments and/or textual segments);
    - detection module(s) 322, including one or more of a hotspot detection module, a topical center detection module, a music detection module, and a predefined audio type detection module for detecting features of the segments and selecting which segments, from the plurality of segments generated by segmentation module 320, are enabled to be included in a generated trailer;
    - genre criteria module 324 for storing and/or updating criteria, such as descriptors selected based on a genre of the media content item, to be applied to the segments in order to select which segment(s) to include in the generated trailer; and
  - one or more server data module(s) 330 for handling the storage of and/or access to media items and/or metadata relating to the media items; in some embodiments, the one or more server data module(s) 330 include:
    - a media content database 332 for storing media items; and
    - a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
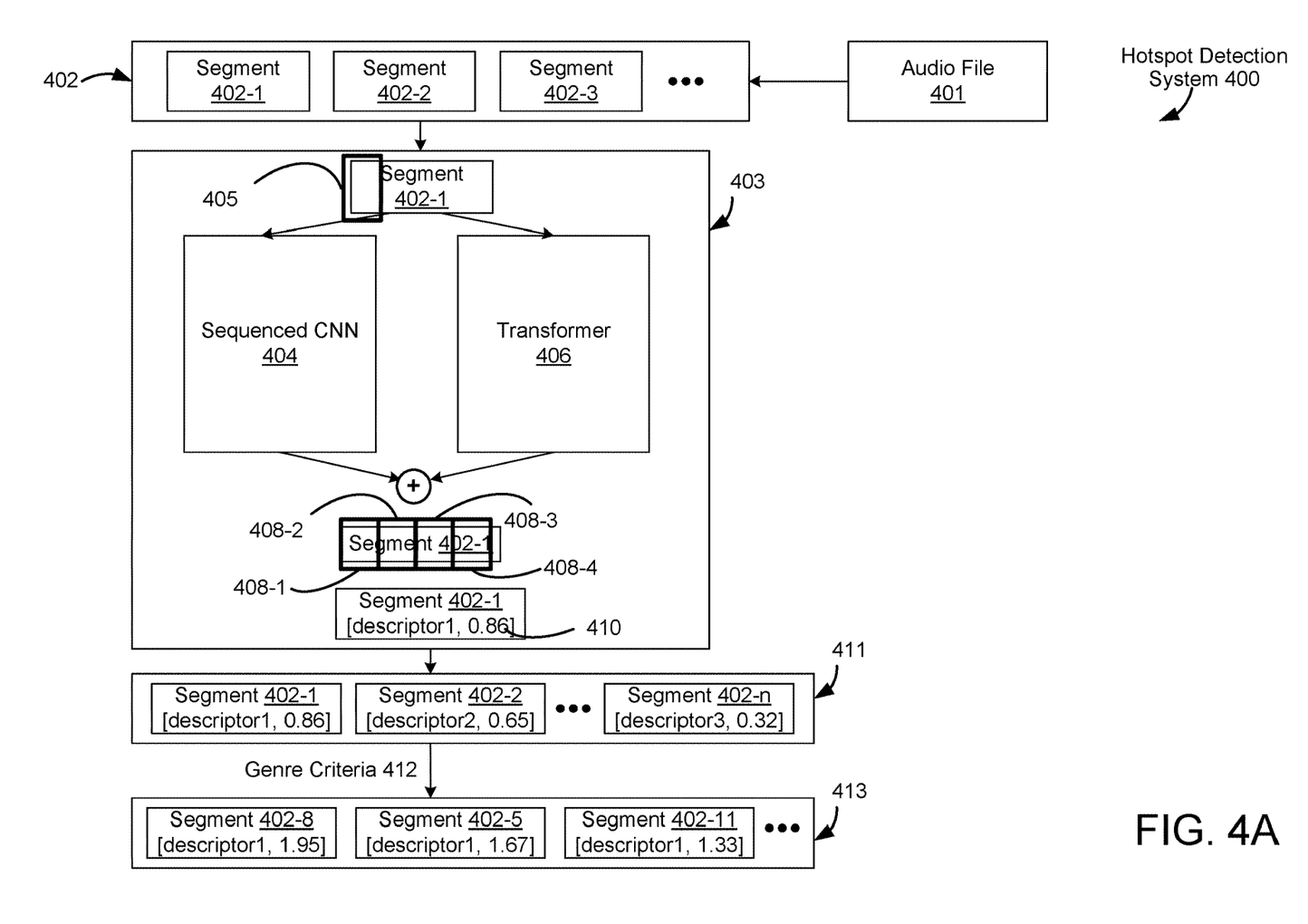
FIG. 4A-4B are block diagrams illustrating systems for generating trailers for an audio file using hotspot detection, in accordance with some embodiments.
Figure 4B:
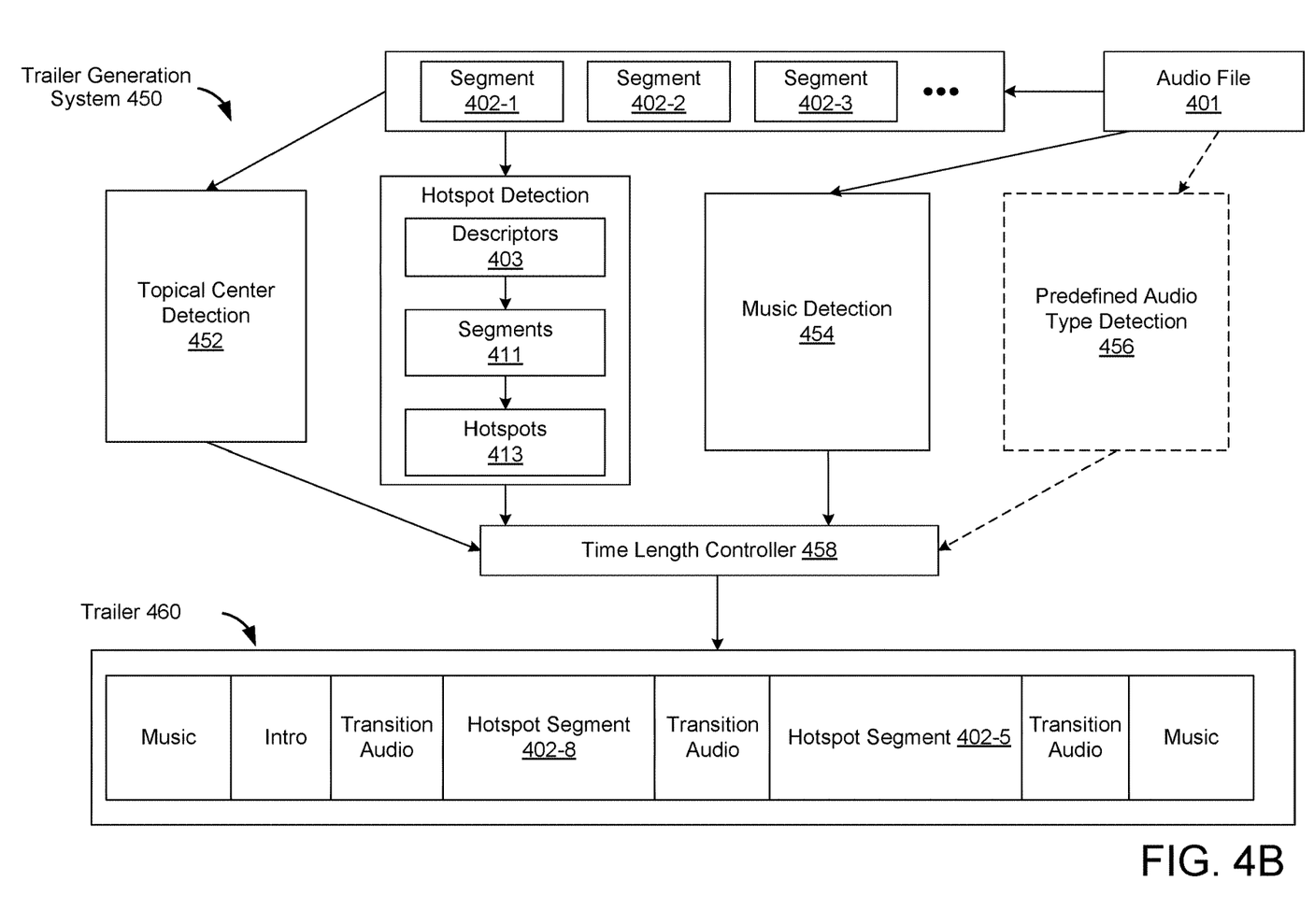

FIGS. 4A-4B are block diagrams illustrating generation of a trailer for an audio item. FIG. 4A illustrates a hotspot detection system 400. FIG. 4B illustrates a trailer generation system 450, a portion of which includes the hotspot detection system described with reference to FIG. 4A. Accordingly, FIG. 4A illustrates additional details for the system detecting hotspots, and FIG. 4B illustrates the hotspot detection system implemented with additional detection systems (e.g., topical center detection 452, music detection 454, and predefined audio type detection 456).

The hotspot detection system 400 divides a media content item (e.g., audio file 401) into a plurality of segments 402 (e.g., segment 402-1, segment 402-2, segment 402-3, etc.). In some embodiments, the plurality of segments 402 includes a plurality of textual segments (e.g., each textual segment corresponding a transcript of the audio for the segment) and/or a plurality of audio segments for the entirety of the media content item.

In some embodiments, the system obtains a transcript of the audio file as an input. In some embodiments, the system transcribes the media content item (e.g., using an internal tool). For example, audio file 401 is a podcast and the system 400 obtains the transcript and the audio for the podcast. In some embodiments, the system divides the media item into textual segments and/or audio segments based on the transcript of the audio file. For example, each segment corresponds to a length of a sentence of the transcript. In some embodiments, the system produces textual segments and audio segments for the audio file 401. For example, respective textual segments and respective audio segments are synchronized (e.g., based on timing of the audio file 401). In some embodiments, each segment is a predefined length (e.g., or within a range of predefined lengths). In the example described below, segments 402-1, 402-2 and 402-3 are audio segments.

In some embodiments, for each segment (e.g., each audio segment), the system determines (403) a descriptor and a value of a strength of the descriptor (410, "descriptor1, 0.86") for the segment. It will be understood that the processes described in FIG. 4A may be performed on audio segments and/or textual segments of the audio file 401.

In some embodiments, determining the descriptor and the value of the strength of the descriptor includes determining a descriptor and a value of the strength of the descriptor for a plurality of time windows (e.g., a rolling time window) within the segment. In some embodiments, as illustrated in FIG. 4A, a rolling time window 405 (e.g., of predefined length, such as a 3-second rolling time window) is applied to a first segment 402-1. In some embodiments, for each portion (e.g., comprising a window of time) of the first audio segment in the rolling time window, a representation of the audio segment (e.g., a Mel spectrogram or other two-dimensional array) is generated, and the representation of the audio segment is provided to a parallel neural network, which includes providing the representation of the audio segment, in parallel, to a sequenced convolutional neural network (CNN) 404 and a transformer neural network 406. In some embodiments, the sequenced CNN 404 performs max pooling, a series of convolutions (e.g., 4 convolutions) and flattens the result, and the transformer neural network 406 comprises a series of encoders used to determine a time-domain mean. In some embodiments, the outputs of the sequenced CNN 404 and the transformer neural network 406 are then concatenated (e.g., as represented by the "+" in FIG. 4A).

In some embodiments, the concatenated outputs are then used to determine (e.g., using softmax), for each rolling time window 408 (e.g., 408-1, 408-2, 408-3, 408-4, etc), a descriptor selected from a set of descriptors and a value for the descriptor (e.g., a value for the strength of the descriptor). For example, values are calculated for each descriptor in the set of descriptors for the rolling time window and the descriptor with the greatest value is determined as the descriptor for the respective rolling time window. In some embodiments, the set of descriptors are predefined by a user. In some embodiments, the set of descriptors comprises a set of emotions. For example, the set of descriptors comprises two or more of: joy, surprise, anger, fear, disgust, sad, and neutral. It will be understood that additional or alternative descriptors may also be used.

For example, as illustrated in FIG. 4A, segment 402-1 is divided into sub-portions (e.g., windows of time) 408 as the rolling time windows 405 are applied to the segment 402-1. Each sub-portion 408 is assigned a descriptor from the set of descriptors (and, in some embodiments, a value of the descriptor of the sub-portion describing how strongly that descriptor correlates to the sub-portion). For example, sub-portion 408-1 is assigned a first descriptor (e.g., fear), sub-portion 408-2 is assigned a second descriptor (which can be the same descriptor or a different descriptor than the first descriptor) (e.g., fear), sub-portion 408-3 is assigned a third descriptor (which can be the same descriptor or a different descriptor as the first and/or second descriptors) (e.g., anger) and sub-portion 408-4 is assigned a fourth descriptor (which can be the same descriptor or a different descriptor as the first, second and/or third descriptors) (e.g., disgust), and so on. Although the sub-portions 408 illustrated in FIG. 4A do not appear to overlap, it will be understood that in some embodiments, the rolling time window 405 is moved along segment 402-1 at intervals shorter than the sub-portions (e.g., windows of time) 408 such that the sub-portions overlap with each other (e.g., the rolling window is 3-seconds and a new window is established at 1-second intervals such that the a subsequent sub-portion overlaps a current sub-portion by 2-seconds).

After determining a descriptor (and value of the descriptor) for each sub-portion (time window) 408 for the segment 402-1, a single descriptor is determined for the overall segment (e.g., segment 402-1). For example, the descriptor for the segment is determined based on the descriptor that was assigned most often to the sub-portions of the segment 402-1.

In some embodiments, a value for the descriptor for the overall segment 402-1 is also determined (e.g., as an average of the values of the descriptor determined for each sub-portion of the segment). In some embodiments, the values of the descriptors are determined using the neural network (e.g., by generating a linear combination of the outputs of CNN 404 and transformer NN 406 and applying an activation function, such as Softmax). For example, descriptor1 with a value of 0.86 is determined (410) for segment 402-1. In some embodiments, the value of the descriptor indicates how strongly that descriptor represents the segment (e.g., a higher value corresponds to a stronger representation of the descriptor for the segment).

In some embodiments, set of labeled segments 411 includes the plurality of segments 402-1 through 402-n (where n is an integer greater than 2) for the audio file 401 (e.g., each segment of the audio file 401 is labeled with a descriptor and a value of the descriptor via process 403). For example, process 403 is repeated for each segment in the set of segments 402. In some embodiments, for each segment in the set of labeled segments 411, a descriptor and a value of the descriptor is assigned to the segment.

After assigning a respective descriptor and a respective value of the descriptor to each of the segments, the system applies genre criteria 412 to the segments. In some embodiments, genre criteria 412 define target descriptor(s) that correlate to a particular genre (e.g., wherein the target descriptor(s) are used to identify hotspots for the media item). For example, for a "true crime" genre, the genre criteria 412 define that "fear" is the target descriptor. In some embodiments, a user is enabled to select the genre (and/or genre criteria) to be applied to the audio file 401. In some embodiments, the genre (and genre criteria) of the audio file 401 are automatically determined by the system based on a classification scheme (e.g., without user input). In some embodiments, a user is enabled to update the genre and/or genre criteria in order to change the target descriptor(s). For example, a content creator is enabled to update the genre criteria such that the system identifies hotspots that have been tagged with a "joy" descriptor even though the genre of the audio file is identified as a "true crime" genre (instead of using the default target descriptor(s) for the genre, such as "fear").

After applying the genre criteria 412 to the set of labeled segments 411, the system identifies a set of hotspot segments 413, which includes a subset (e.g., less than all) of the set of labeled segments 411 that have descriptor(s) that match the genre criteria 412. For example, the target descriptor is "descriptor1" and the set of hotspot segments 413 only includes segments that have been assigned "descriptor1" as the descriptor. In some embodiments, the set of hotspot segments 413 are ordered based on the value of the target descriptor (e.g., instead of being ordered based on timing of the segment within the audio file). For example, segment 402-8 has the greatest value of descriptor1 of 1.95, while segment 402-5 has the second greatest value of descriptor1 of 1.67, etc. It will be understood that in some embodiments, the set of hotspot segments 413 are ordered based on the timing of the segment within the audio file (e.g., the segments are presented in the order in which they appear within the audio file).

In some embodiments, the set of hotspot segments 413 are further filtered (not shown) to remove segments that are unwanted in the generated trailer for the audio file. For example, in addition to applying genre criteria 412, one or more additional filters are applied to the set of labeled segments 411 and/or to the set of segments 413 (e.g., the one or more additional filters can be applied to either set to concurrently apply the filters with the genre criteria 412 or to apply the one or more additional filters after applying the genre criteria 412). In some embodiments, the filters remove segments that include spoilers, inappropriate language, or other content that a user does not want to include in the generated trailer from the set of hotspot segments 413. In some embodiments, a user is enabled to control types of segments to be removed from the set of hotspot segments (e.g., a content creator is enabled to exclude profanity from the trailer). For example, the user is enabled to select various filters to apply to the set of segments.

In some embodiments, after detecting the set of hotspot segments 413, the system selects one or more hotspot segments to include in the trailer. For example, the system selects the hotspot segments with the greatest value of the target descriptor (or other genre criteria).

FIG. 4B illustrates trailer generation system 450, which determines one or more additional components (in addition to the hotspot detection described in FIG. 4A) of the audio file to include in a generated trailer 460. For example, in addition to the hotspot detection described above with reference to FIG. 4A, the system is also enabled to determine a topic (e.g., summary) of the audio file (e.g., topical center detection 452). For example, the system identifies a segment from the audio file 401 that best represents a topic of the audio file to be included as an introduction (or summary) of the audio file 401 within the trailer 460 for the audio file.

In some embodiments, the topical center detection 452 is performed by generating embeddings for each segment (e.g., segments 402), where the segments comprise audio segments or textual segments (e.g., from a transcript corresponding to the audio file), as described with reference to FIG. 4A. In some embodiments, the embeddings for each segments are compared with embeddings of a document (e.g., such as a description of the audio file (e.g., a podcast episode description)) that is received as an input to the system for topical center detection 452. In some embodiments, a similarity score is calculated for each segment (e.g., each segment corresponding to a sentence) as compared with the input document. In some embodiments, the segment that has the greatest similarity score is selected as the most topically representative for the audio file 401. This selected segment is included in the trailer 460 as the "intro" segment.

In some embodiments, the system also determines one or more musical portions of the audio file to be included in the trailer 460 via music detection 454. In some embodiments, music detection 454 identifies a plurality of music segments from audio file 401 using a neural network and arranges the music segments according to length (e.g., from the longest music segments to the shortest music segments). In some embodiments, the music segments selected to be included in the trailer 460 comprise the longest music segments. For example, the two "music" segments illustrated in trailer 460 comprise the longest two music segments identified from audio file 401.

In some embodiments, the system optionally determines one or more portions of a predefined audio type that occurs in the audio file 401 via predefined audio type detection 456. In some embodiments, the predefined audio type (e.g., laughter, applause, explosions, or other types of audio) that is detected for a particular audio file depends on the genre of the audio file 401. For example, in accordance with a determination that the audio file is a first genre type, the system detects a first type of predefined audio. For example, for a comedy genre, the system detects laughter and for a sports genre, the system detects applause. In some embodiments, segments that are detected using predefined audio type detection 456 are used in place of hotspot segments in the trailer 460 (not shown). For example, instead of including hotspot segments detected using the hotspot detection process described with reference to FIG. 4A, the system places segments of the audio file that include the predefined audio type (e.g., laughter, applause, etc.) in trailer 460. In some embodiments, the trailer generation system 450 includes both hotspot segments and segments identified using the predefined audio type detection 456.

In some embodiments, trailer generation system 450 includes time length controller 458 that analyzes the segments identified from the topical center detection 452, hotspot detection (e.g., hotspot segments 413), music detection 454 and/or predefined audio type detection 456, and selects one or more of the identified segments to include in the trailer 460 based on time constraints (e.g., a predefined length of the trailer 460). For example, time length controller 458 determines how many of each type of segment (e.g., hotspot segment, music segment, etc.) to include in trailer 460 based on the lengths of the segments and the target length for the trailer. In some embodiments, time length controller 458 arranges the selected segments to generate trailer 460. In some embodiments, the arrangement of segments is predefined (e.g., a music segment, then an introductory segment, then a transition segment, then a hotspot segment, etc.). In some embodiments, the transition audio segment is an additional audio segment that is not from the audio file 401. For example, the transition audio segments included in trailer 460 are selected from a group of transition audio segments (e.g., based on a genre of audio file 401) to be placed between the selected segments identified by the trailer generation system in order to provide a smooth transition between the selected segments.

It will be understood that the trailer generation system 450 is enabled to include any combination of segments identified using the system above. For example, the trailer 460 does not have to include each type of segment identified (e.g., the trailer 460 may include hotspot segments without including an intro segment).

Figure 5A:
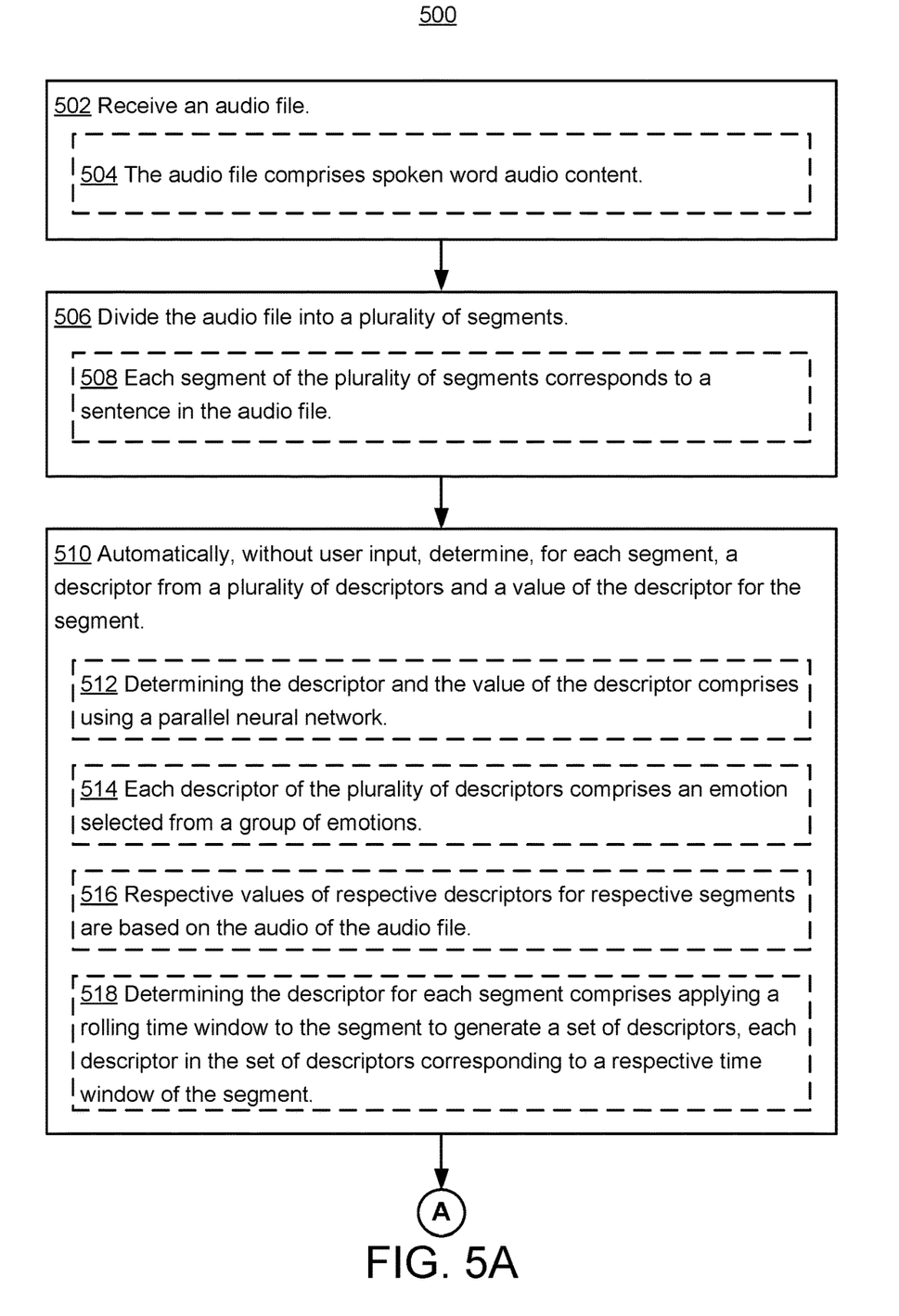
FIGS. 5A-5B are flow diagrams illustrating a method for generating trailers for an audio file, in accordance with some embodiments.
Figure 5B:
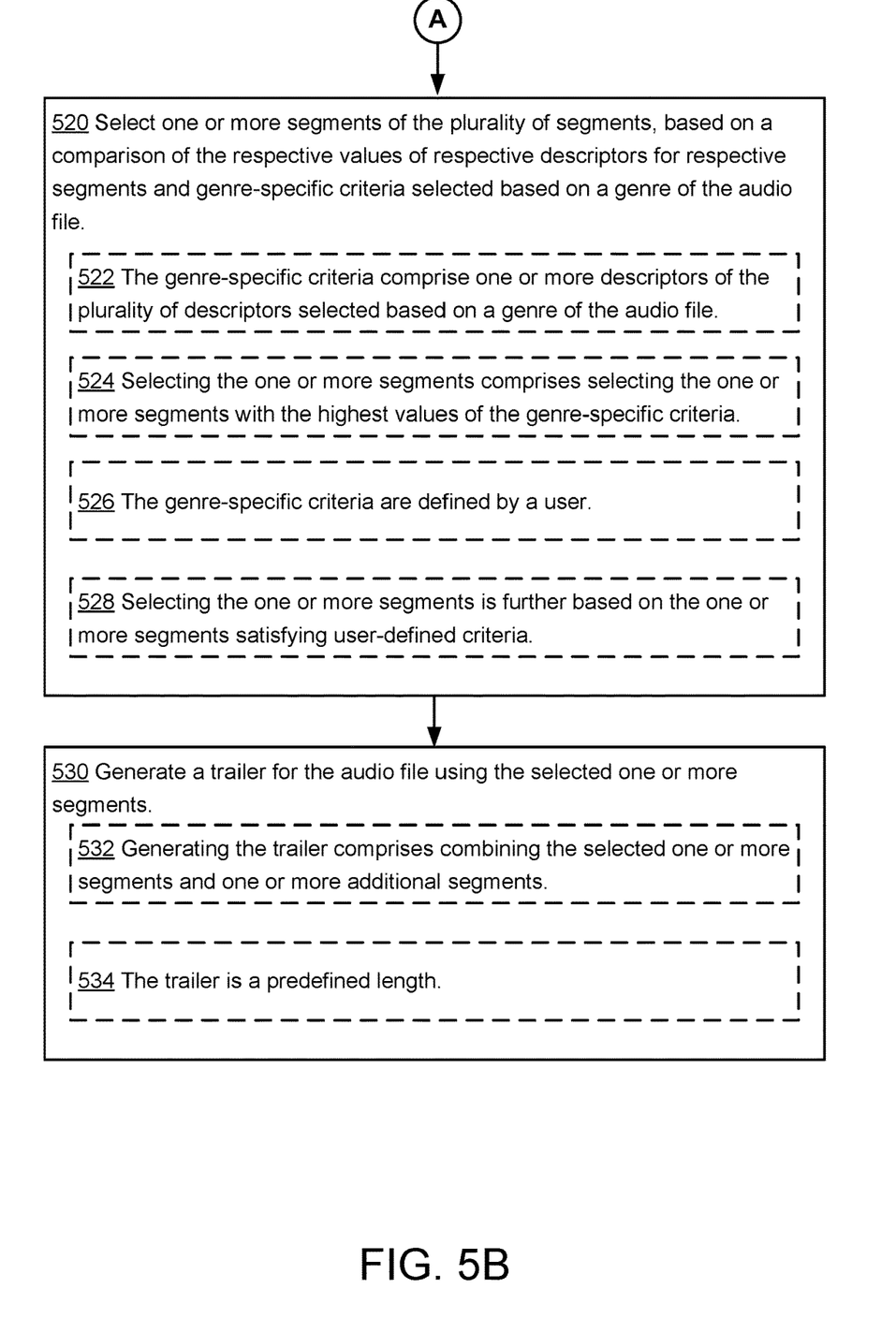

FIGS. 5A-5B are flow diagrams illustrating a method 500 of automatically generating a trailer for an audio file, in accordance with some embodiments. Method 500 may be performed at an electronic device (e.g., media content server 104 and/or electronic device(s) 102) having one or more processors and memory storing instructions for execution by the one or more processors. In some embodiments, the method 500 is performed by executing instructions stored in the memory (e.g., memory 212, FIG. 2, memory 306, FIG. 3) of the electronic device. In some embodiments, the method 500 is performed by a combination of the server system (e.g., including media content server 104 and CDN 106) and a client device.

Referring now to FIG. 5A, in performing the method 500, the electronic device receives (502) an audio file (e.g., audio file 401 illustrated in FIGS. 4A-4B).

In some embodiments, the audio file comprises (504) spoken word audio content (e.g., a podcast, an audiobook, etc.). In some embodiments, the audio file is the audio content of a media content item that includes an audio portion and an additional portion (e.g., a video). In some embodiments, the audio file comprises music.

The electronic device divides (506) the audio file into a plurality of segments. For example, as described with reference to FIG. 4A, audio file 401 is divided into a plurality of segments 402 (e.g., segment 402-1, segment 402-2, segment 402-3, etc.). In some embodiments, the entirety of the audio file is divided into segments (e.g., every portion of the audio file is in a segment). In some embodiments, a portion, less than all, of the audio file is divided into segments (e.g., to exclude portions of the audio file that correspond to commercials, introductions, credits, etc.).

In some embodiments, each segment of the plurality of segments corresponds to (508) a sentence in the audio file. For example, the audio file 401 is mapped to a transcript of the audio file, and dividing the audio file 401 into segments comprises determining the start (e.g., and/or end) of a sentence (e.g., using the transcript) such that each segment comprises a sentence of the audio file. In some embodiments, the electronic device receives a transcript (e.g., as an additional input) corresponding to the audio file. In some embodiments, the segments 402 comprise portions of the transcript (e.g., the segments are textual segments). In some embodiments, the segments 402 comprise portions of audio from the audio file 401 (e.g., the segments are audio segments) corresponding to sentences. It will be understood that the system is enabled to use audio segments and/or textual segments to determine hotspots, as described with reference to FIG. 4A. In some embodiments, the type of segment used to determine the hotspots is based on the type of audio file. For example, a podcast uses audio segments to determine hotspots while an audiobook uses textual segments to determine the hotspots. In some embodiments, the segments 402 are a predefined length (e.g., or within a predefined range of lengths). For example, each segment has a minimum and/or maximum length (e.g., between 10 seconds and 50 seconds).

The electronic device, automatically, without user input, determines (510), for each segment, a descriptor from a plurality of descriptors and a value of the descriptor for the segment. For example, the descriptors are not assigned to the segments based on user input (e.g., or user feedback). For example, the descriptors are selected using a neural network or other automated process that does not require input from a user. For example, as described with reference to FIG. 4A, the descriptor descriptor1 and a value of 0.86 is determined for segment 402-1 without user input.

In some embodiments, determining (512) the descriptor and the value of the descriptor comprises using a parallel neural network. For example, as described with reference to FIG. 4A, the parallel neural network comprises sequenced CNN 404 and transformer neural network 406 to determine the descriptor and value of the descriptor of the segment (e.g., [descriptor1, 0.86] for segment 402-1).

In some embodiments, each descriptor of the plurality of descriptors comprises (514) an emotion selected from a group of emotions. For example, "descriptor1" corresponds to an emotion, such as "fear" selected from a group of emotions. In some embodiments, the group of emotions is predefined. For example, as described above, the set of descriptors comprises two or more of: joy, surprise, anger, fear, disgust, sad, and neutral. It will be understood that additional or alternative descriptors may also be used.

In some embodiments, respective values of respective descriptors for respective segments are (516) based on the audio of the audio file (e.g., not the transcription). For example, the descriptor and the value of a segment is based on an audio segment (not a textual segment). For example, while the textual segment corresponding to a transcript of the segment includes particular words, the tone and/or other characteristic of the audio is important to be considered in order to generate a more accurate descriptor. For example, using only the text of a true crime podcast, a sentence may state "she arrived at the party" which, in text, may produce a descriptor of "joy" because of the word "party," but with the tone of the speaker, this sentence may sound more ominous and be assigned a different descriptor, such as "fear." Accordingly, it is important that in some embodiments, only textual segments or only audio segments are used to predict (e.g., determine) the descriptors (and values of the descriptors) for segments. In some embodiments, both the textual segments and audio segments are used to predict the descriptors. In some embodiments, the value of the first descriptor is based on the text file corresponding to the transcript.

In some embodiments, determining the descriptor for each segment comprises (518) applying a rolling time window (e.g., of a predefined length (3 seconds)) to the segment to generate a set of descriptors, each descriptor in the set of descriptors corresponding to a respective time window of the segment. For example, as described with reference to FIG. 4A, a rolling time window 405 is applied to segment 402-1, and a set of descriptors is determined for each sub-portion 408 of the segment 402-1. In some embodiments, the sub-portions overlap each other. In some embodiments, the rolling time window is shorter than a length of the segment (e.g., the rolling time window is a 3-second window).

The electronic device selects (520) one or more segments (e.g., hotspot segments) of the plurality of segments, based on a comparison of the respective values of respective descriptors for respective segments and genre-specific criteria selected based on a genre of the audio file. (Note that, although the term "criteria" is used, it should be understood that the genre-specific criteria may include a single criterion, such as a single descriptor, or may include a plurality of criteria). For example, as described with reference to FIG. 4A, the device applies (e.g., compares) the set of labeled segments 411 with genre criteria 412 and selects the set of hotspot segments 413 based on the segments in the set of labeled segments 411 that match (e.g., have the descriptor(s) of) the genre criteria 412.

In some embodiments, the genre-specific criteria comprise (522) one or more descriptors of the plurality of descriptors selected based on a genre of the audio file. For example, the genre-specific criteria comprise an emotion selected from the set of emotions based on the genre of the audio file. For example, different genres of audio files are assigned to different descriptors as the genre-specific criteria (e.g., true crime is assigned "fear", while comedy is assigned "joy"). In some embodiments, the genre-specific criteria comprise a recipe that defines particular characteristics of the segments. In some embodiments, the descriptor is a vector that represents characteristics of the audio, and are matched to corresponding vectors that represent the genre-specific criteria.

In some embodiments, selecting (524) the one or more segments comprises selecting the one or more segments with the highest values of the genre-specific criteria. For example, as described with reference to the set of hotspot segments 413 in FIG. 4A, the set of hotspot segments are ordered based on the value of descriptor1 such that the selected segments are the first predefined number of hotspot segments that have the highest values of descriptor1. For example, as illustrated in FIG. 4B, only segments 402-8 and 402-5 from the set of hotspot segments 413 are selected to be included in trailer 460. In some embodiments, the number of segments selected to be included in the trailer 460 is a predefined number (e.g., 2 segments, 3 segments, etc.). In some embodiments, the number of segments selected to be in the trailer 460 is based on the length of the selected segments. For example, where the trailer cannot be more than a predefined length (e.g., 1 minute long), the device determines a number of hotspot segments that can be included in the trailer without exceeding the predefined length (e.g., which is further dependent on the length of the hotspot segments).

In some embodiments, the genre-specific criteria are defined (526) (or updated) by a user. For example, a user (e.g., a creator of the audio file 401) selects a different recipe, or a different set of genre-specific criteria to generate the trailer. For example, the genre-specific criteria are not automatically selected based on a genre of audio file 401. In some embodiments, the genre-specific criteria are automatically selected (e.g., as default criteria) based on the genre of audio file 401, but the user is enabled to change the genre-specific criteria (e.g., to select a different descriptor as the criteria).

In some embodiments, selecting the one or more segments is (528) further based on the one or more segments satisfying user-defined criteria. For example, in addition to the genre-specific criteria 412, the user is enabled to select additional filters to apply to the set of segments before selecting the segments to include in trailer 460. For example, the additional filters include selecting a particular speaker that is identified as speaking in the segment. In some embodiments, the electronic device provides a set of controls that allows the user to implement additional criteria (e.g., or to replace/update the genre-specific criteria).

The electronic device generates (530) a trailer for the audio file using the selected one or more segments. For example, as illustrated in FIG. 4B, trailer 460 is generated using hotspot segment 402-8 and hotspot segment 402-5 (e.g., selected from the set of hotspot segments 413). In some embodiments, the term "trailer" refers to a compilation of segments that capture the overall stylistic qualities (e.g., a vibe, emotion or feeling) of the audio item. For example, the hotspot segments are selected and arranged (e.g., compiled) to generate a "vibe clip" (e.g., trailer) for the audio item. As such, a user that listens to the trailer is provided with a representative vibe or emotion associated with the audio item as a whole.

In some embodiments, generating the trailer comprises (532) combining the selected one or more segments and one or more additional segments (e.g., one or more music segments, one or more intro segments, and/or one or more transition audio segments, etc.). For example, as described with reference to FIG. 4B, the trailer generation system 450 includes performing topical center detection 452 (e.g., to determine an introductory segment), music detection 454, and optionally, predefined audio type detection 456.

In some embodiments, the trailer is (534) a predefined length (e.g., or range of lengths). For example, the predefined length is 1-minute (e.g., or between 50 seconds and 1-minute). For example, time length controller 458, shown in FIG. 4B, determines (e.g., stores) the predefined length and selects the one or more segments (e.g., hotspot segments, music segments, intro segment, and/or transition audio segments) to include in the generated trailer 460.

In some embodiments, the generated trailer 460 is provided to a user for playback. For example, a user is enabled to select the trailer 460 and playback the trailer. In some embodiments, after generating trailer 460, the user is enabled to change (e.g., update) the genre criteria and/or other user-specified criteria and the device repeats the process described in FIG. 4A by applying additional criteria and/or alternative genre criteria 412 to generate an additional trailer. In some embodiments, the electronic device is enabled to generate a plurality of trailers for the audio file 401 and the user is enabled to select which trailer of the plurality of trailers to be stored in association with the audio file 401. For example, a content creator (e.g., user) is enabled to select, from the plurality of generated trailers, which trailer to publish for the public (e.g., other users of the media-providing service) in association with audio file 401.

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at an electronic device:
receiving an audio file;
dividing the audio file into a plurality of segments;
automatically, without user input, determining, for each respective segment, a descriptor from a plurality of descriptors and a value of the descriptor for the segment, wherein determining the descriptor for each respective segment comprises:
applying a rolling time window to the respective segment to generate a set of descriptors, each descriptor in the set of descriptors corresponding to a respective time window of the respective segment, wherein the rolling time window is shorter than a length of the respective segment;
selecting one or more segments, less than all, of the plurality of segments, based on a comparison of the respective values of respective descriptors for respective segments and genre-specific criteria selected based on a genre of the audio file; and
generating a summarized version of the audio file by arranging the selected one or more segments.

2. The method of claim 1, wherein determining the descriptor and the value of the descriptor comprises using a parallel neural network.

3. The method of claim 2, wherein the value of the descriptor describes how strongly that descriptor correlates to the segment.

4. The method of claim 1, wherein the genre-specific criteria comprise one or more descriptors of the plurality of descriptors selected based on a genre of the audio file.

5. The method of claim 1, wherein each descriptor of the plurality of descriptors comprises an emotion selected from a group of emotions.

6. The method of claim 1, wherein the audio file comprises spoken word audio content.

7. The method of claim 1, wherein selecting the one or more segments comprises selecting the one or more segments with highest values of the genre-specific criteria.

8. The method of claim 1, wherein respective values of respective descriptors for respective segments are based on the audio of the audio file.

9. The method of claim 1, wherein the genre-specific criteria are defined by a user.

10. The method of claim 1, wherein selecting the one or more segments is further based on the one or more segments satisfying user-defined criteria.

11. The method of claim 1, wherein generating the trailer summarized version of the audio file comprises combining the selected one or more segments and one or more additional segments.

12. The method of claim 1, wherein each segment of the plurality of segments corresponds to a sentence in the audio file.

13. The method of claim 1, wherein the summarized version of the audio file is a predefined length.

14. A computer system, comprising:
one or more processors; and
memory storing one or more programs, the one or more programs including instructions for:
receiving an audio file;
dividing the audio file into a plurality of segments;
automatically, without user input, determining, for each respective segment, a descriptor from a plurality of descriptors and a value of the descriptor for the segment, wherein determining the descriptor for each respective segment comprises:
applying a rolling time window to the respective segment to generate a set of descriptors, each descriptor in the set of descriptors corresponding to a respective time window of the respective segment, wherein the rolling time window is shorter than a length of the respective segment;
selecting one or more segments, less than all, of the plurality of segments, based on a comparison of the respective values of respective descriptors for respective segments and genre-specific criteria selected based on a genre of the audio file; and
generating a summarized version of the audio file by arranging the selected one or more segments.

15. A non-transitory computer-readable storage medium storing one or more programs for execution by a computer system with one or more processors, the one or more programs comprising instructions for:
receiving an audio file;
dividing the audio file into a plurality of segments;
automatically, without user input, determining, for each respective segment, a descriptor from a plurality of descriptors and a value of the descriptor for the segment, wherein determining the descriptor for each respective segment comprises:
applying a rolling time window to the respective segment to generate a set of descriptors, each descriptor in the set of descriptors corresponding to a respective time window of the respective segment, wherein the rolling time window is shorter than a length of the respective segment;
selecting one or more segments, less than all, of the plurality of segments, based on a comparison of the respective values of respective descriptors for respective segments and genre-specific criteria selected based on a genre of the audio file; and
generating a summarized version of the audio file by arranging the selected one or more segments.

16. The computer system of claim 14, wherein the genre-specific criteria comprise one or more descriptors of the plurality of descriptors selected based on a genre of the audio file.

17. The computer system of claim 14, wherein determining the descriptor and the value of the descriptor comprises using a parallel neural network.

18. The computer system of claim 14, wherein each descriptor of the plurality of descriptors comprises an emotion selected from a group of emotions.

19. The computer system of claim 14, wherein the audio file comprises spoken word audio content.

20. The computer system of claim 14, wherein selecting the one or more segments comprises selecting the one or more segments with highest values of the genre-specific criteria.

* * * * *